(12) United States Patent
Grover

(10) Patent No.: US 11,563,988 B2
(45) Date of Patent: **\*Jan. 24, 2023**

(54) EMPLOYING AUTOMATIC CONTENT RECOGNITION TO ALLOW RESUMPTION OF WATCHING INTERRUPTED MEDIA PROGRAM FROM TELEVISION BROADCAST

(71) Applicant: Roku, Inc., San Jose, CA (US)

(72) Inventor: Matthew Grover, Wales (GB)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,970

(22) Filed: Jan. 11, 2022

(65) Prior Publication Data

US 2022/0132184 A1    Apr. 28, 2022

Related U.S. Application Data

(63) Continuation of application No. 17/329,773, filed on May 25, 2021, now Pat. No. 11,252,446, which is a
(Continued)

(51) Int. Cl.
*H04N 21/234* (2011.01)
*H04N 21/472* (2011.01)
(Continued)

(52) U.S. Cl.
CPC ..... *H04N 21/23418* (2013.01); *H04N 21/222* (2013.01); *H04N 21/234* (2013.01);
(Continued)

(58) Field of Classification Search
CPC .......... H04N 21/23418; H04N 21/222; H04N 21/234; H04N 21/44; H04N 21/44008;
(Continued)

(56) References Cited

U.S. PATENT DOCUMENTS 7,103,906 B1 * 9/2006 Katz ................. H04N 21/2393
348/E7.071
2003/0204856 A1 10/2003 Buxton
(Continued)

OTHER PUBLICATIONS

International Search Report, Application No. PCT/US2018/024035, dated May 24, 2018, 13 pages.

*Primary Examiner* — Kunal Langhnoja
(74) *Attorney, Agent, or Firm* — Sterne, Kessler, Goldstein & Fox P.L.L.C.

(57) ABSTRACT

The disclosure provides a method for employing automatic content recognition to allow resumption of watching interrupted media program from television broadcast. The method includes detecting a viewing cessation of a media program on a channel of a media device. A television broadcaster provides media content including the channel. The channel includes the media program. The method also includes, in response to detecting the viewing cessation of the media program, identifying the channel, the media program, the television broadcaster, and a location of the viewing cessation within the media program. The method further includes detecting a viewing recommencement of the channel of the media device. In response to detecting the viewing recommencement, the method includes overlaying a selectable indicator on the channel. The selectable indicator is configured to receive a selection input to resume viewing of the media program starting at the location of the viewing cessation of the media program.

20 Claims, 6 Drawing Sheets

Related U.S. Application Data continuation of application No. 15/933,899, filed on Mar. 23, 2018, now Pat. No. 11,051,054.

(60) Provisional application No. 62/476,159, filed on Mar. 24, 2017.

(51) Int. Cl.
| | |
|---|---|
| *H04N 21/81* | (2011.01) |
| *H04N 21/44* | (2011.01) |
| *H04N 21/61* | (2011.01) |
| *H04N 21/222* | (2011.01) |
| *H04N 21/462* | (2011.01) |

(52) U.S. Cl.
CPC ....... *H04N 21/44* (2013.01); *H04N 21/44008* (2013.01); *H04N 21/4622* (2013.01); *H04N 21/47217* (2013.01); *H04N 21/6125* (2013.01); *H04N 21/812* (2013.01)

(58) Field of Classification Search
CPC ......... H04N 21/4622; H04N 21/47217; H04N 21/6125; H04N 21/812
See application file for complete search history.

(56) References Cited

U.S. PATENT DOCUMENTS

| | | |
|---|---|---|
| 2008/0282295 A1 | 11/2008 | Gabriel et al. |
| 2011/0311194 A1* | 12/2011 | Yeo .................... H04N 5/76 386/230 |
| 2016/0191913 A1* | 6/2016 | Martch ............ H04N 21/25841 348/189 |
| 2016/0314974 A1 | 10/2016 | Iguchi |
| 2016/0366474 A1* | 12/2016 | Chen .................... H04N 21/812 |
| 2017/0013324 A1 | 1/2017 | Chen |

* cited by examiner

EMPLOYING AUTOMATIC CONTENT RECOGNITION TO ALLOW RESUMPTION OF WATCHING INTERRUPTED MEDIA PROGRAM FROM TELEVISION BROADCAST

CROSS REFERENCE TO RELATED APPLICATIONS

This U.S. patent application is a continuation under 35 U.S.C. § 120 of U.S. patent application Ser. No. 17/329,773, filed May 25, 2021, which is a continuation under 35 U.S.C. § 120 of U.S. patent application Ser. No. 15/933,899, filed Mar. 23, 2018, and issued on Jun. 29, 2021 as U.S. Pat. No. 11,051,054, which claims priority under 35 U.S.C. § 119(e) to U.S. Provisional Application 62/476,159, filed on Mar. 24, 2017 the contents of all of which are incorporated herein by reference in their entirety.

TECHNICAL FIELD

This disclosure relates to employing automatic content recognition to allow resumption of watching interrupted media program from television broadcast.

BACKGROUND

Media consumption devices, such as smart televisions (TVs), may access broadcast digital content and receive data, such as streaming media, from data networks (such as the Internet). Streaming media refers to a service in which media content such as movies or news may be provided to an end user over a telephone line, cable, Internet, and so forth upon request. For example, a user may view a movie without having to leave their residence. Also, users may access various types of educational content, such as video lectures, without having to physically attend at a school or educational institution.

As the number of media consumption devices (or, simply, "media devices") continues to increase, video content generation and delivery may similarly increase. With an increase in use of media devices (such as smartphones, tablets, and smart televisions) to access streaming media, content or network providers (such as local broadcasters, multi-channel networks, and other content owners/distributors) may distribute contextually-relevant material to viewers that are consuming streaming media (e.g., media programs). For example, local broadcasters may include contextually-relevant advertisements and interactive content with streaming media.

SUMMARY

One aspect of the disclosure provides a method for employing automatic content recognition to allow resumption of watching interrupted media program from television broadcast. The method includes detecting, by data processing hardware, a viewing cessation of a media program on a channel of a media device. A television broadcaster provides media content including the channel. The channel includes the media program. The method also includes, in response to detecting the viewing cessation of the media program, identifying, by the data processing hardware, the channel, the media program, the television broadcaster, and a location of the viewing cessation within the media program. The method further includes detecting, by the data processing hardware, a viewing recommencement of the channel of the media device. In response to detecting the viewing recommencement, the method includes overlaying, by the data processing hardware, a selectable indicator on the channel. The selectable indicator is configured to receive a selection input to resume viewing of the media program starting at the location of the viewing cessation of the media program.

Implementations of the disclosure may include one or more of the following optional features. In some implementations, detecting the viewing cessation of the media program further includes receiving, at the data processing hardware, a query fingerprint corresponding to at least one frame of the media content from the media device and determining, by the data processing hardware, that the query fingerprint fails to match frame fingerprints of the media program. The frame fingerprints of the media program may correspond to sequential frames of the media program stored in a fingerprint database in communication with the data processing hardware.

In some examples, when identifying, by the data processing hardware, the channel, the media program, the television broadcaster, and the location of the viewing cessation within the media program, the method includes receiving, at the data processing device, a query fingerprint corresponding to media content from a content feed at the media device. Here, the query fingerprint represents sequential frames of the media content from the content feed and comprises a time stamp corresponding to a temporal position within the content feed. In this example, the method may also include determining, by the data processing hardware, that the query fingerprint matches at least one frame fingerprint of a plurality of frame fingerprints of the media content provided by the television broadcaster. The matched at least one frame fingerprint is associated with a respective channel of the television broadcaster, a respective media program of the channel, and a respective location within the respective media program of the respective channel.

In some implementations, when identifying, by the data processing hardware, the channel, the media program, the television broadcaster, and the location of the viewing cessation within the media program the method includes receiving, at the data processing device, a query fingerprint corresponding to media content from a content feed at the media device. The query fingerprint represents sequential frames of the media content from the content feed and includes a time stamp corresponding to a temporal position within the content feed. Here, the method includes determining, by the data processing hardware, that the query fingerprint matches at least one frame fingerprint of a plurality of frame fingerprints of the media content provided by the television broadcaster. The matched at least one fingerprint is associated with a respective channel of the television broadcaster. The method may also include identifying, by the data processing hardware, a respective media program from scheduling data for the channel and a respective location within the respective media program of the channel based on the time stamp of the query fingerprint.

In some configurations, detecting, by the data processing hardware, the viewing cessation of the media program includes continuously receiving query fingerprints corresponding to media content from a content feed at the media device. The method may also include determining, by the data processing hardware, that a viewer of the media device selected the selection input to resume the media program starting at the location of the viewing cessation within the media program and providing, by the data processing hardware, the location of the viewing cessation within the media program to an advertisement targeter. The advertisement targeter is configured to identify overlay content for the viewer based on viewing habits of the viewer. Optionally, the method may also include, determining, by the data processing hardware, that a viewer of the media device selected the selection input to resume the media program starting at the location of the viewing cessation within the media program and playing, from the data processing hardware, the media program on the media device starting at the location of the viewing cessation within the media program.

In some examples, the media device is a smart television and the media program from the television broadcaster corresponds to a live media feed source. In this example, the live media feed source may be a Hypertext Transfer Protocol (HTTP) live streaming (HLS) stream. Optionally, the viewing cessation may correspond to a channel change or a loss of power to the media device.

Another aspect of the disclosure provides a system for employing automatic content recognition to allow resumption of watching interrupted media program from television broadcast. The system includes data processing hardware and memory hardware in communication with the data processing hardware. The memory hardware stores instructions that when executed on the data processing hardware cause the data processing hardware to perform operations. The operations include detecting a viewing cessation of a media program on a channel of a media device. A television broadcaster provides media content including the channel. The channel includes the media program. In response to detecting the viewing cessation of the media program, identifying the channel, the media program, the television broadcaster, and a location of the viewing cessation within the media program. The operations also include viewing recommencement of the channel of the media device a return of the media device. In response to detecting the viewing recommencement, the operations include overlaying a selectable indicator on the channel. The selectable indicator is configured to receive a selection input to resume viewing of the media program starting at the location of the viewing cessation of the media program.

This aspect may include one or more of the following optional features. In some implementations, the operation of detecting the viewing cessation of the media program includes receiving a query fingerprint corresponding to at least one frame of the media content from the media device and determining that the query fingerprint fails to match frame fingerprints of the media program. The frame fingerprints of the media program correspond to sequential frames of the media program stored in a fingerprint database in communication with the data processing hardware. The operation of identifying the channel, the media program, the television broadcaster, and the location of the viewing cessation within the media program may include receiving a query fingerprint corresponding to media content from a content feed at the media device. The query fingerprint represents sequential frames of the media content from the content feed and includes a time stamp corresponding to a temporal position within the content feed. The operation of identifying the channel, the media program, the television broadcaster, and the location of the viewing cessation within the media program may also include determining that the query fingerprint matches at least one frame fingerprint of a plurality of frame fingerprints of the media content provided by the television broadcaster. The matched at least one frame fingerprint is associated with a respective channel of the television broadcaster, a respective media program within the channel, and a respective location within the respective media program of the respective channel.

In some examples, the operation of identifying the channel, the media program, the television broadcaster, and the location of the viewing cessation within the media program includes receiving a query fingerprint corresponding to media content from a content feed at the media device. The query fingerprint represents sequential frames of the media content from the content feed and includes a time stamp corresponding to a temporal position within the content feed. Here, the operation also includes determining that the query fingerprint matches at least one frame fingerprint of a plurality of frame fingerprints of the media content provided by the television broadcaster. The matched at least one frame fingerprint is associated with a respective channel of the television broadcaster. In this example, the operation further includes identifying a respective media program from scheduling data for the respective channel and a respective location within the respective media program of the respective channel based on the time stamp of the query fingerprint.

In some configurations, the operation of detecting the viewing cessation of the media program includes continuously receiving query fingerprints corresponding to media content from a content feed at the media device. The operations may also include determining that a viewer of the media device selected the selection input to resume the media program starting at the location of the viewing cessation within the media program and providing the location of the viewing cessation within the media program to an advertisement targeter. The advertisement targeter is configured to identify overlay content for the viewer based on viewing habits of the viewer. Additionally or alternatively, the operations may include determining that a viewer of the media device selected the selection input to resume the media program starting at the location of the viewing cessation within the media program and playing the media program on the media device starting at the location of the viewing cessation within the media program.

In some examples, the media device is a smart television and the media program from the television broadcaster corresponds to a live media feed source. Here, the live media feed source may be a Hypertext Transfer Protocol (HTTP) live streaming (HLS) stream. Optionally, the viewing cessation may correspond to a channel change or a loss of power to the media device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
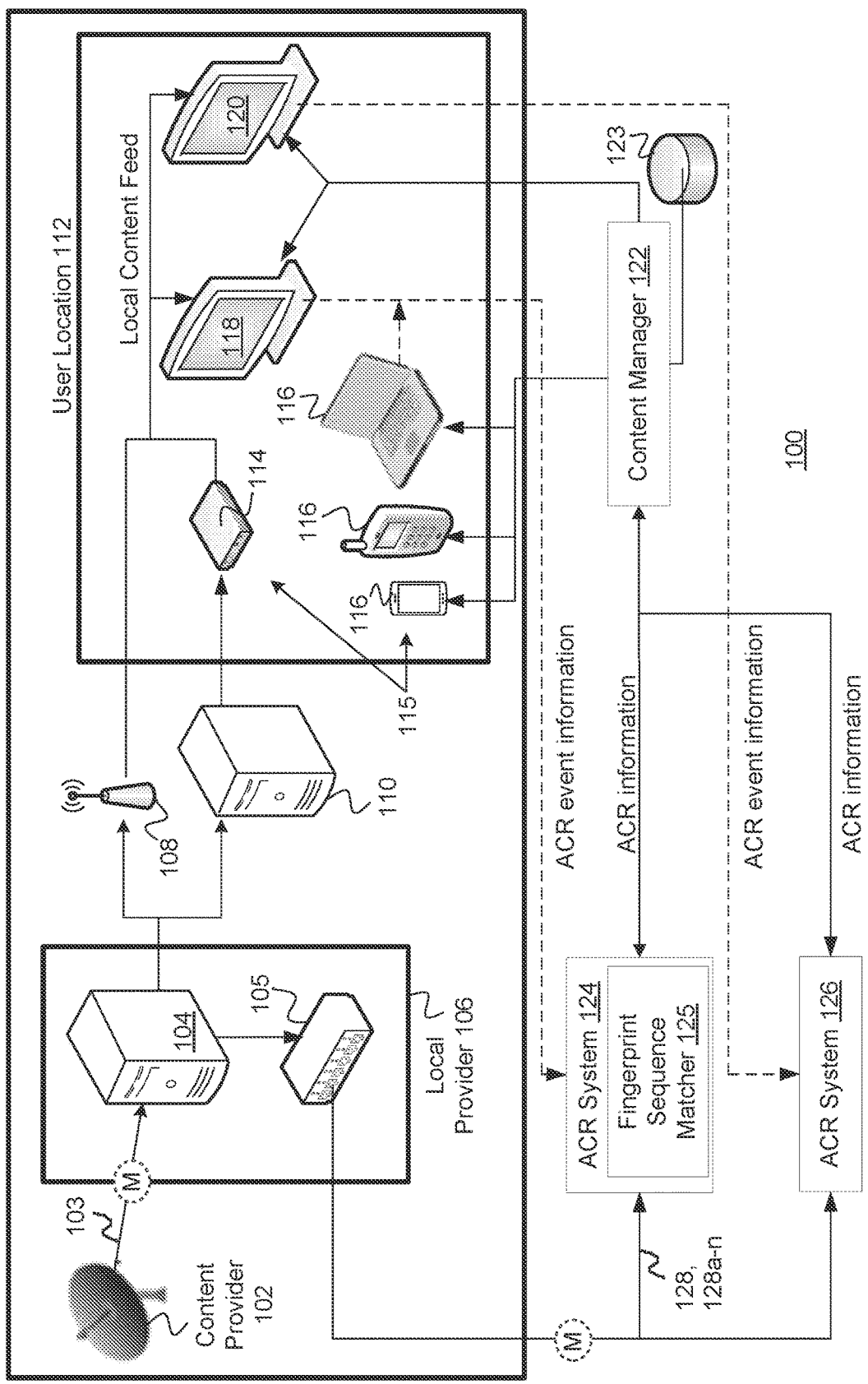
FIG. 1 illustrates a schematic view of an example system diagram of a content distribution network.

Media content broadcasting or streaming, such as television (TV) or internet show broadcasting, are media sources of continued popularity from which to obtain digital media entertainment. Many users seeking such media content have increasingly used different types of media devices through which to stream broadcasted television content, to include, for example, a set top box, an aerial antenna, a satellite dish, or an internet-enabled device, to include a smart TV or other media device. The same TV channel may be streamed to (or through) any one of these media devices according to a channel schedule for different media programs. Until now, no media-device-level method has existed to detect the interruption of viewing of a media program, regardless of the source of the television broadcast, and provide a way for a viewer to return to that media program upon the media device returning to the same channel.

The disclosed automatic content recognition (ACR) system facilitates such functionality, which will be discussed in more detail, as follows. The ACR system may first perform fingerprinting of streamed media content, received as a live media feed, to identify the channel. The ACR system may then access current scheduling information for the identified channel to identify the media program being viewed. When the ACR system detects the media program has been interrupted, such as by a change of channel, loss of power, the media device going into a sleep state, or a user turning off the media device, the ACR system may record the channel and location in, and source of, the media program at termination of viewing in recorded ACR data. At a later time, when the user returns to the channel of the media device, the ACR system may deliver an overlay to the display of the media device requesting whether the user wants to continue watching the media program that was previously interrupted. If the user chooses to continue watching the program, the overlay may trigger streaming of the media program from the original source (or an ACR-buffered source) at the location where the media program was interrupted.

The disclosed ACR system may receive, from a media device, a query fingerprint that includes an ordered sequence of frames of content being consumed by the user. The ACR system may match the query fingerprint with frame fingerprints, which are stored by the system for individual frames of programs streaming to a plurality of television channels, by determining a distance between respective frame fingerprints and corresponding ones of the ordered sequence of frames. A distance may include, for example, a numerical value indicating how different the two frames are from each other or a difference between channels on which the two respective frames are being streamed. The distance may also be determined as a distance between an average of a group of frames and an average of another group of frames, where the fingerprints are a sequence of frames of the media content. The ACR system may also determine when a channel is changed or the TV stops streaming the media content of a media program when the fingerprints for the media program no longer match during the television broadcast.

To provide viewers with media content, an individual or an organization may stream the media content to viewers, such as by delivering the media content over the Internet to the viewers. The media content used by the individual or the organization may be media content (such as video data) acquired from one or more live broadcast media feeds. For example, a media content provider may provide a user at a media device with a linear media channel (e.g., media provided from a live media feed source to a viewer) over the Internet or over other media.

The word "content" may be used to refer to media or multimedia. The word "content" may also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content may include graphical representations, such as: videos, films, television shows, commercials, streaming video, and so forth; text; graphics; animations; still images; interactivity content forms; and so forth. An example of a type of content commonly referred to as a type of media is a "motion picture" referred to as "a film."

In some examples, a content overlay system or a content overlay device may enable combining media content with specific, timely, and/or targeted overlay content such as advertising. The content overlay system or content overlay device may enable overlay content providers to engage with viewers by inviting the viewers to respond to a call to action within the content overlays (e.g., an invitation to engage the content overlay). One advantage of inviting the viewers to a call to action may be to provide a return path or follow-up path for the viewers to request additional information, ask questions, provide input, contact a provider of a service or product advertised, and so forth. Another advantage of inviting the viewer to a call to action may be to provide a return path or follow up path for the advertisers to provide additional information, further engage the viewers, gather additional information about the viewers, answer viewer questions about the product or service advertised, and so forth. In another example, the content overlay system or the content overlay device may enable an advertiser to use cross platform retargeting campaigns once a viewer has viewed and/or interacted with an overlay content of a media program.

FIG. 1 illustrates a system diagram of a content distribution network 100 according to one example. In the content distribution network 100, a content provider 102 (e.g., a television broadcaster) may broadcast a content feed 103 to a local provider 106. The local provider 106 may include a headend 104 and an automatic content recognition (ACR) fingerprinter server 105. The content feed 103 from the content provider 102 may be received at the headend 104 of the local provider 106.

In various implementations, the headend 104 may generate a local content feed 103 based on the received content feed 103. For example, the headend 104 may be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 may communicate the local content feed 103 to the ACR fingerprinter server 105, an over-the-air (OTA) broadcaster 108, and/or a multichannel video programming distributor (MVPD) 110. The OTA broadcaster 108 and/or the MVPD 110 may communicate the local content feed 103 to a media device 115. Some examples of the media devices 115 include client devices 118 and 120 (e.g., smart TVs), a set top box 114 that streams provider content to the client devices 118 and 120, as well as other devices 116 (e.g., OTA antenna, satellite dish, and the like) through which the user may stream the local content feed 103.

In one example, the OTA broadcaster 108 may broadcast the local content feed 103 using traditional local television or radio channels. In this example, the client devices 118 and 120 may include antennas (such as TV or radio antennas) and receive the local content feed 103. In another example, the MVPD 110 (such as cable or satellite broadcaster) may communicate the local content feed 103 to a set top box 114. In this example, the set top box 114 may format the content feed 103 for the client devices 118 and 120 and may communicate the formatted content feed 103 to the client devices 118 and 120. The client devices 118 and 120 may include a display device, such as a television screen or a touch screen, to display the local content to a viewer. Various components of the content distribution network 100 may be integrated or coupled to the client devices 118 and 120. For example, a smart television may include the antennas, the set top box 114, and a display device in a single unit.

The ACR fingerprint server 105 may analyze the local content feed 103 and determine fingerprint information (e.g., fingerprints). In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints 128a-n to a cloud-based web service. In some implementations, the ACR fingerprinter server 105 may be installed inside the broadcast facility in order to fingerprint a feed in advance of that feed being delivered to a display device, such as a television (TV).

The ACR fingerprint server 105 may communicate the fingerprints 128a-n to ACR systems 124 and/or 126. The ACR systems 124 and 126 may be different ACR systems selected by device manufacturers, such as smart TV manufacturers. In some implementations, as described below, the ACR system 124 includes an ACR fingerprint sequence matcher 125. The ACR fingerprint sequence matcher 125 may match frame fingerprints 128a-n to the original video content from which the corresponding video frames originate. The ACR system 126 may or may not have the ACR fingerprint sequence matcher 125. Details regarding the ACR fingerprint sequence matcher 125 are described below with respect to FIG. 3, where the fingerprint sequence matcher may alternatively be located within the content manager 122.

The ACR fingerprint server 105 may analyze the local content feed 103 and capture fingerprints 128a-n, which may include an ordered sequence of frames from the local content feed 103. The ACR fingerprint server 105 may communicate the fingerprints 128a-n to the ACR systems 124 and/or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors. The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 105 can be to enable entities such as advertisers, advertising agencies, and content providers to interface with a single platform and deliver advanced advertising and content experiences to electronic devices from multiple CEMs.

In various implementations, the ACR fingerprint server 105 formats fingerprints 128a-n for the different ACR systems 124 and 126, e.g., that include different types of fingerprinting technology such as different fingerprinting algorithms. The ACR systems 124 and 126 may establish communication connections with the different media devices 115, including the client devices 118 and 120, respectively. The client devices 118 and 120 may communicate fingerprint information to the ACR systems 124 and 126, respectively. When the ACR system 124 or 126 receives ACR fingerprint information from the client devices 118 and/or 120, the ACR system 124 or 126 matches the received fingerprints 128a-n with those generated by the ACR fingerprint server 105 and when a match occurs and the content has been identified, may communicate ACR events to a content manager 122.

In another example, the ACR systems 124 and 126 receives ACR fingerprint information from the client devices 118 and 120 and matches the received fingerprints 128a-n with those generated by the ACR fingerprint server 105. When a match occurs and the content has been identified, the ACR systems 124 and/or 126 may notify the client device 118 or 120 of the ACR events and then the client device 118 or 120 may communicate those ACR events to a content manager 122. Alternatively, or additionally, the ACR systems 124 and/or 126 directly communicates the ACR events to the content manager 122. The ACR fingerprint information may include a display of advertisements in the local content feed 103 to a viewer, a display of selected or flagged content in the local content feed 103 to a viewer, a change of content channel at the client device 118 or 120, and so forth.

The event information from the different ACR systems 124 and 126 may be generated in different formats and the content manager 122 may normalize the data into a common format before storing the data into a recorded ACR information database 123 (e.g., database 123 for ease of explanation). For example, the content manager 122 may receive disparate data sets from the ACR systems 124 and 126 that include similar but not identical data, such as data with the same content but formatted differently. The content manager 122 may process and reformat the disparate data sets to create a single data model or format (e.g., reformatted data sets) and the reformatted data sets may be populated into the database 123 in the content manager 122. The event information from the ACR systems, which is stored in the database 123, may further include recorded ACR data from information recorded from users viewing behaviors, interests, and specific viewing history of specific media programs.

In some implementations, to normalize disparate data sets from ACR systems 124 and 126, the content manager 122 may cleanse or filter data in the data sets. For example, some data sets may contain fields or data that may be irrelevant to the content manager 122. In this example, the content manager 122 cleanses or filters the irrelevant data (e.g., the data may be removed or ignored). In another example, some data sets includes instances of incomplete or incorrect data or data sets and the content manager 122 may cleanse or filter the incomplete or incorrect data or data sets. In another implementation, to normalize the disparate data sets from ACR systems 124 and 126, the content manager 122 maps fields of the data sets. For example, when the content manager 122 receives a first data set from the ACR system 124 and a second data set from the ACR system 126, at least some of the data fields of the first data set and the second data set may be common to both the first and second data set. However, the common data fields may be located at different places in the first and second data sets. In this example, the content manager 122 maps the different data fields of the first and second data sets to normalized fields and have the same data fields in the same data field locations in the database 123.

In another embodiment, to normalize disparate data sets from the ACR systems 124 and 126, the content manager 122 derives data from the data sets. For example, data from the ACR systems 124 and/or 126 may not contain all of the fields that are needed to fill the data fields in the database. However, the content manager 122 may use other fields in the data sets from the ACR systems 124 and 126 to derive data for these data fields.

In some examples, the database 123 includes data fields for such as a state in a country field, a designated market area (DMA), and a county and/or city field, but the data sets from the ACR systems 124 and 126 may only include zone improvement plan (ZIP) codes. In this example, the content manager 122 uses the ZIP codes to derive data for the fields in the database. In another example, the data set does not contain any geographic location information, but may include an internet protocol (IP) address of the ACR systems 124 and 126. In this example, the content manager 122 uses a geo-IP lookup service to derive the state, DMA, county, city and ZIP code information.

In another example, the database 123 includes demographic fields, such as an age field, a gender field, a household income field, and so forth. However, the data sets from the ACR systems 124 and 126 may not include the demographic fields or demographic data. In this example, the ACR systems 124 and 126 provides the content manager 122 with the IP address of the client devices 118 and 120. The content manager 122 may use the IP addresses to determine the demographic data to populate the data fields in the database.

In another example, a field in a first data set from the ACR system 124 includes local time zone information, such as a mountain daylight time (MDT) zone, and a second data set from the ACR system 126 may include information from another time zone, such as a coordinated universal time (UTC) zone. The database may store all data using the UTC and the content manager 122 may convert the local time to UTC before storing the data in the database 123.

In some implementations, the content manager 122 uses the normalized data to generate reports or data (viewing data) about user viewing behavior across different ACR technology vendors and smart TV or other Internet-connected video devices. The content manager 122 and the media devices 115 may include communications interfaces to communicate information, such as overlay content and recorded ACR data, between the media devices 115 and the content manager 122.

In some examples, the communication interface communicates the information using a cellular network and/or a wireless network. In one example, the communications network is a cellular network that may be a third generation partnership project (3GPP) release 8, 9, 10, 11, or 12, long term evolution (LTE), or Institute of Electronics and Electrical Engineers (IEEE) 802.16p, 802.16n, 802.16m-2011, 802.16h-2010, 802.16j-2009, 802.16-2009. In another example, the communications network is a wireless network (such as a network using the Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In yet another example, the communications network is a Bluetooth® connection developed by Bluetooth Special Interest Group (SIG) such as Bluetooth v1.0, Bluetooth v2.0, Bluetooth v3.0, or Bluetooth v4.0. In another embodiment, the communications network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In some implementations, the content manager 122 also instructs the media devices 115 to replace portions of the local content feed 103 received from the OTA broadcaster 108 or the MVPD 110 with overlay content. Moreover, in some examples, the content manager 122 may instruct the media devices 115 to overlay or superimpose overlay content onto portions of the local content feed 103. The content manager 122 may aggregate ACR information across multiple ACR systems 124 and 126 and may communicate overlay content to different client devices 118 and 120, where the client devices 118 and 120 may be from different device manufacturers.

The content manager 122 may also establish communication connections with other devices 116 categorized generally as media devices 115. In one example, the other device 116 communicates with the client devices 118 or 120 and provides an additional screen (e.g., a second screen) to display overlay content. For example, the client devices 118 and 120 may receive the local content feed 103 from the OTA broadcaster 108 or the MVPD 110 and display the local content feed 103 to the user. The other devices 116 may also communicate ACR event information to the ACR systems 124 and 126 when an ACR event occurs, as discussed in the preceding paragraphs. When the content manager 122 receives the ACR event information, the content manager 122 may communicate overlay content to the other devices 116.

In some examples, the client devices 118 and 120 continue to display the local content feed 103 while the other devices 116 display the overlay content. In additional examples, the client devices 118 and 120 and the other devices 116 both display the overlay content. In yet further examples, the client devices 118 and 120 and the other devices 116 display a portion of the overlay content and a portion of the local content feed 103. The client devices 118 and 120 and the other devices 116 may display different local content feed 103s and/or overlay content.

The client devices 118 and 120 and/or the other devices 116 may display the overlay content at the time the overlay content is received. In some examples, the client devices 118 and 120 and/or the other devices 116 delay displaying the overlay content for a threshold period of time. The threshold period of time may be a predefined period of time or the content manager 122 may select a period of time for the client devices 118 and 120 and/or the other devices 116 to delay displaying the overlay content.

Figure 2:
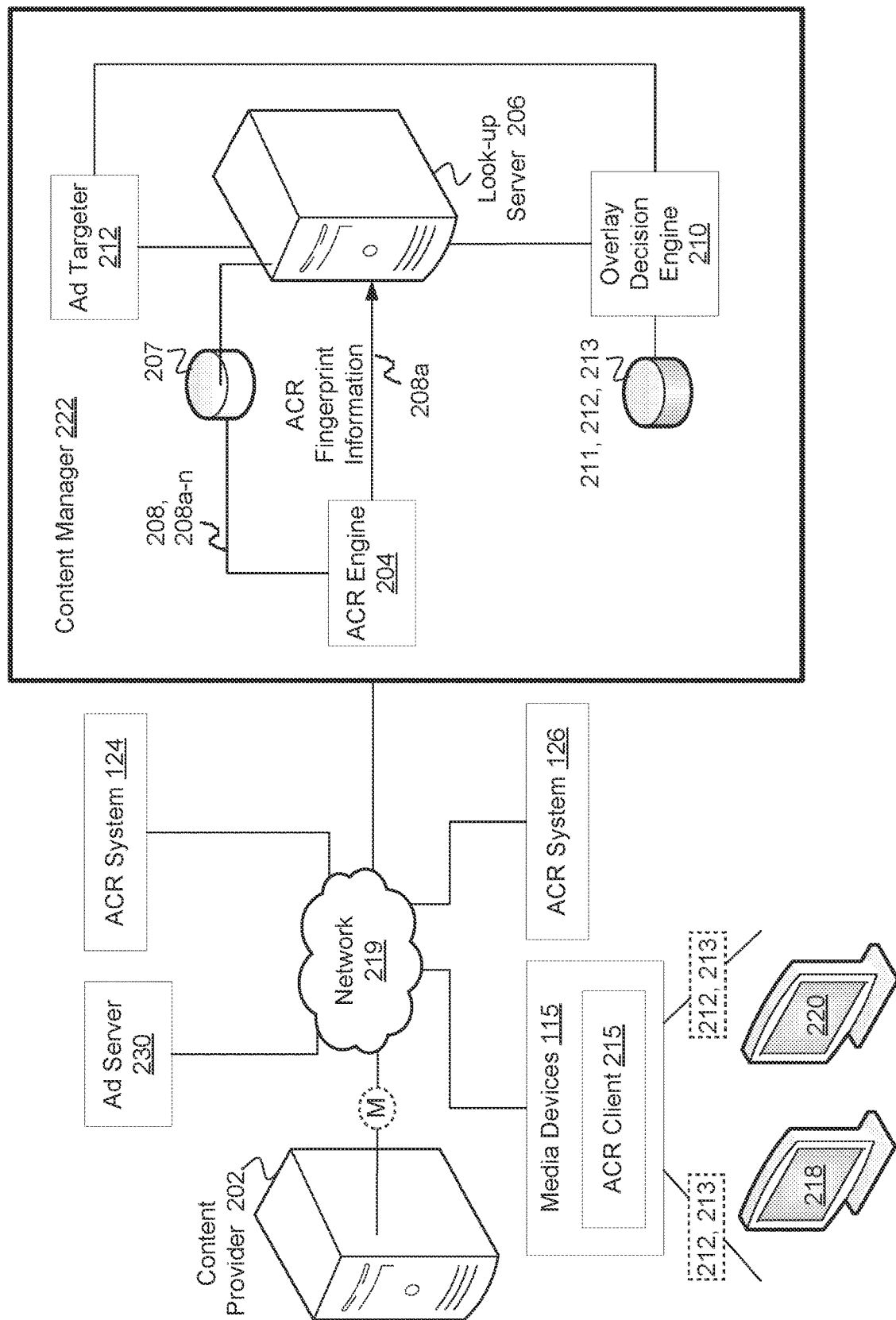
FIG. 2 illustrates a schematic view of an example of a content manager to provide overlay content to a client device.

FIG. 2 illustrates a content manager 222 to provide overlay content 212 to a media device 115 such as to client devices 218 and/or 220 according to some implementations. A content provider 202 (e.g., a television broadcaster) may stream media content M to the media device 115 over a network 219, which streaming may be intercepted by the content manager 222 before or simultaneously with the streaming of the media content M to the media device 115. The content manager 222 may also communicate with an advertisement server (or "ad" server) 230 such as to send the ad server 230 an advertising call that requests an advertisement be served with (or as an overlay 212 to) the media content M to target the subject matter of the media content M and/or interests of a user as will explained in more detail. The ad server 230 may be a third party or external server that provides advertising or other overlay content 212 to the content manager 222 for later delivery to the media devices 115 or may provide the content directly to the media devices 115 for delivery as overlay 212 or replacement advertisements.

The content manager 222 may include an ACR engine 204, a look-up server 206, an overlay decision engine 210, an overlay database 211 in which to store overlay content 212, and an ad targeter 214. The content provider 202 may upload media content M to the ACR engine 204 over the network 219.

The ACR engine 204 may fingerprint the media content M. In one example, the ACR engine 204 generates fingerprints 208a-n by fingerprinting every frame of a feed, every other frame of the feed, a sequence of frames and so forth. For example, the ACR engine 204 may generate a fingerprint 208 for a frame of the feed by performing a discrete cosine transform (DCT) of the frame and designating a subset of the resulting coefficients (e.g., the low-frequency coefficients) as the fingerprint 208. Additionally, or alternatively, the ACR engine 204 may generate (or identify) a target block of fingerprints 208a-n that correspond to an ordered sequence of frames of content being streamed to a media device 115. Furthermore, the look-up server 206 may find a matching source block of frame fingerprints 208a-n stored in a fingerprint database 207 for the originating media programs (e.g., originating content) for which an identity is known.

In another or related implementation, the ACR engine 204 analyzes ACR event information to determine what event may have occurred, e.g., a positive match between a sequence-of-frames query fingerprint 208a and frame fingerprints 208a-n of originating content stored in the ACR system 124 or 126. When there is a positive match, the ACR engine 204 sends a positive match indicator to the requesting media device 115 that may include a media content identifier (ID) that identifies the content for which a positive match results. The media device 115 may send an overlay request to the overlay decision engine 210 requesting a media content overlay 212. In one example, the overlay request includes the media content ID. In another example, the overlay request includes overlay information or overlay parameters.

With further reference to FIG. 2, the ACR engine 204 may communicate fingerprints 208a-n to the look-up server 206, which may look up and determine a television program (e.g., scheduled for an identified channel) and location within the television program corresponding to an ACR event received from the ACR system 124 or 126. Each fingerprint 208 of a segment of the feed may be associated with a time stamp. The time stamp belongs to individual frames of the segment of the feed when received by the ACR engine 204. The time stamp may be a frame number within the feed from an arbitrary starting point. The look-up server 206 stores the fingerprints 208a-n in association with their respective time stamps (e.g., in the fingerprint database 207), and aids the ad targeter 214 and the overlay decision engine 210 in timing and content targeting within the media content M of the feed that the user is viewing.

In some implementations, the ACR engine 204 interacts with an ACR client 215 at various media devices 115. The ACR client 215 may locally match fingerprints 208a-n and confirm whether or not the user has changed a channel to watch a different television program, and to report the channel change to the content manager 222. Accordingly, matching of fingerprints 208a-n may occur locally at the media devices 115 in some cases.

Furthermore, the ACR client 215 may periodically, continuously, or semi-continuously communicate user fingerprint information to the look-up server 206, e.g., in the form of query fingerprints 208a, including target blocks, requesting to confirm the television program or channel being watched on the media device 115. The look-up server 206 may determine when there is a match between the query fingerprint(s) 208a (or target blocks) and a multitude of frame fingerprints 208a-n, which may be stored as source blocks of fingerprints 208a-n in the fingerprints database 207 or across the network 219 from the look-up server. The query fingerprint 208a may be an ordered sequence of frames, respective ones of which may be matched with individual ones of the frame fingerprints 208a-n until finding a sufficient match to be associated with the television program or channel streamed the television program. When there is a positive match, the look-up server 206 communicates a positive match indicator to the ACR client 215. In response to the positive match indicator, the ACR client 215 sends an overlay 212 request to an overlay decision engine 210 requesting a media content overlay 212.

In some examples, the overlay request includes a media content identifier (ID). In additional examples, the overlay request includes overlay information or overlay parameters. For example, the overlay decision engine 210 may use the content ID, overlay information, and/or overlay parameters to identify targeted overlay content 212. In another example, the overlay decision engine 210 uses the content ID, overlay information, and/or overlay parameters to identify an overlay format. The overlay decision engine 210 may compare the content ID, overlay information, and/or overlay parameters with an overlay database 211 to identify the targeted overlay content 212 and the overlay format. The overlay database may be updated, by a content provider or an advertiser (e.g., the ad server 230), with new overlay content 212 and overlay formats on a periodic or continuous basis. The overlay content 212 populates the overlay format (such as an overlay template or the like) before or after being delivered to an overlay 212 position of the streamed media content M of the television program of channel.

The ad targeter 214 tracks and/or analyzes user interaction with and behavior regarding advertisements and other overlay content 212 delivered to the media devices 115 by the overlay decision engine. The ad targeter 214 may also receive and incorporate user profile information with the analysis of user behavior on a per-media-device basis, to determine subject matter of interest to users. This information and data gathered on a user or group of users may extend to preferred viewing times and typical viewing habits with regards to television programs and the channels typically watched, and when. The ad targeter 214 may then inform the overlay decision engine 210, e.g., in the form of parameters, different subject matters of interest and viewing habits that the overlay decision engine 210 may use in deciding what overlay content 212 to select for delivery to respective users, how to format it and when best to deliver for maximum return on investment of campaign budgets.

When the overlay decision engine 210 identifies the targeted overlay content 212 with the help of the ad targeter 214, the overlay decision engine returns targeted overlay content 212 to the media device 115. In one example, the overlay decision engine 210 communicates the targeted overlay content 212 directly to the media device 115, such as via a wireless communications network. In another example, the overlay decision engine 210 communicates the targeted overlay content 212 to the media device 115 via a universal resource locator (URL). When multiple targeted overlay contents 212 match the content ID, overlay information, and/or overlay parameters, the overlay decision engine 210 selects the targeted content overlay 212 that meets a greatest number parameters or other information. Additionally or alternatively, when multiple targeted overlay contents 212 match the content ID, overlay information, and other overlay parameters, the overlay decision engine 210 randomly selects an overlay content 212 that meets the parameters and other information. In further examples, when multiple targeted overlay contents 212 match the content ID, overlay information, and overlay parameters, the overlay decision engine 210 selects predetermined overlay content 212 that matches the content ID, overlay information, and/or overlay parameters. The overlay content 212 may be populated with dynamic content (e.g., content that may be updated or refreshed at periodic intervals). The dynamic content may be stored in a local database or an external system.

The ACR client 215 of the media device 115 may superimpose overlay content 212 over the content feed 103 when the ACR fingerprint information matches the user fingerprint information. In one example, the media device 115 superimposes overlay content 212 over the content feed 103 in a hypertext markup language (HTML) browser. In another example, the media device 115 superimposes overlay content 212 over a content feed 103 from an OTA broadcaster or a cable broadcaster. When the overlay content 212 is placed over the content feed 103, the overlay content 212 may be displayed to the user via a display of the media device 115. In one example, the overlay content 212 includes one or more call-to-action options that may be displayed to a user. In this example, the user interacts with the overlay content 212 using an input device (such as a TV remote, keyboard, a smartphone, or a tablet) to create feedback information. The ACR client 215 may communicate the feedback information to the ad targeter 214. Another individual, such as an advertiser, may access the feedback information and analyze the feedback information to determine desired information, such as user interest in the overlay content 212.

The ACR client 215 may monitor the content feed 103 to determine when the overlay content 212 and content feed match ceases and/or a threshold period of time expires. In one example, when the overlay content 212 and content feed match ceases or a threshold period of time expires, the media device ceases to superimpose the overlay content 212 for display on the media device 115.

Figure 3:
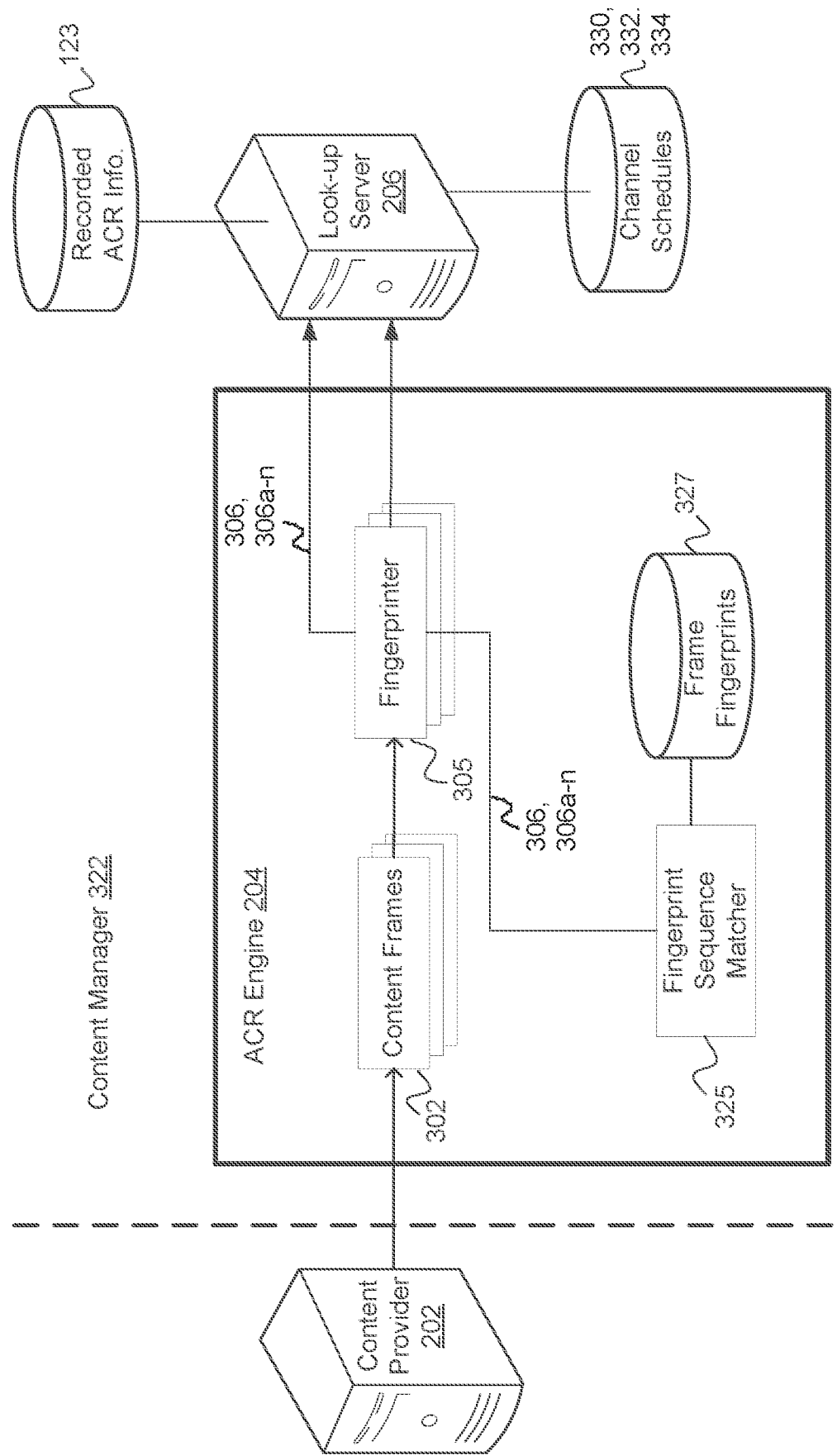
FIG. 3 illustrates a schematic view of an example system diagram of an automatic content recognition (ACR) content manager used to fingerprint media content and control later delivery of an interrupted program.

FIG. 3 is a system diagram of an example ACR content manager 322, such as content manager 122 and 222 illustrated in FIGS. 1 and 2, used to fingerprint media content M and control later delivery of an interrupted program. The content manager 322 may include the ACR engine 204, the look-up server 206, the recorded ACR information database 123, and a channel schedule database 330. The ACR engine 204 receives content frames 302 of the media content M to be fingerprinted. The ACR engine 204 may also include a fingerprinter 305, a fingerprint sequence matcher 325, and a database 327 in which are stored frame fingerprints 306a-n. The content provider 202 generates multimedia content M that is streamed to the media devices 115, including the client devices 218 and/or 220 (FIG. 2).

The content manager 322 may be implemented with a computing device, such as server, or a distributed group of computing devices, to include the look-up server 206. In an alternative implementations, the content manager 322 and the look-up server 206 are combined into a single server device.

In some implementations, the fingerprinter 305 detects or selects a number of content frames 302 from the multimedia content M as a fingerprint 306. For example, the number of content frames 302 may be sequentially ordered (e.g., as a target block), and thus include sequential time stamps from a beginning to an end of the fingerprint 306. In one example, the content is audio data, video data, or both. In this example, video content may be raw video frames.

For example, when the fingerprinter 305 receives the content frames 302, the fingerprinter 305 determines how to process the content frames 302, such as the raw video and/or audio frames to generate the fingerprint 306. In one example, the frames are fingerprinted individually. In another example, the frames are fingerprinted in collections or sequences. The fingerprinter 305 may determine when to fingerprint the frames individually or sequentially based on an ACR algorithm that the fingerprinter 305 executes during fingerprinting, examples of which will be discussed. Additionally, the fingerprinter 305 may fingerprint the content frames 302 differently for different broadcasters or users. In this example, the fingerprinter 305 includes different ACR fingerprinting algorithms for different ACR vendors. In one example, the different ACR fingerprinting algorithms are predetermined and stored in memory of the ACR engine 204.

In yet another example, the different ACR fingerprinting algorithms are provided by third party ACR vendors. When the different ACR fingerprinting algorithms are provided by such vendors, the fingerprinter 305 aggregates the different ACR fingerprinting algorithms. In one example, ACR fingerprinting uses raw video within the YUV 4:2:2 colorspace and at high resolutions or other levels of resolution. When video content is received at the local provider 106 or other content provider 202, the fingerprinter 305 converts the video content to YUV 4:2:0 colorspace and scale it down in resolution to a threshold resolution level for encoding by a broadcaster or distributor before being sent to the media devices 115.

In some implementations, the fingerprinter 305 includes or communicates with the fingerprint sequence matcher 325.

The fingerprint sequence matcher 325 matches a sequence of fingerprints 306a-n to an original video content from which a given set of individual frame fingerprints 306a-n originated as described in more detail below.

When the fingerprinter 305 has fingerprinted the content frames 302, the fingerprinter 305 sends fingerprints 306a-n (including channel information, time codes, and fingerprint information) to the overlay database 211 and/or to the look-up server 206. The look-up server 206 retrieves the fingerprints 306a-n and related information from the overlay database 211. The look-up server 206 may also be in communication or coupled with the overlay decision engine 210 and the ad targeter 214, to send overlay and subject matter matching information to the overlay decision engine 210 and the ad targeter 214 with which to contextually target users on the client device 218 or 220.

In some examples, the different ACR fingerprinting algorithms are used on the same content to provide different fingerprint information to look-up servers of different ACR vendors. An advantage of fingerprinting the same content (e.g., content frames) 302 differently may be to provide contextually-relevant advertisements and interactive content to different viewers of media consumption devices. In additional examples, the content frames 302 includes media content M from different feeds. For example, the different ACR fingerprinting algorithms may be used on the content of the different feeds of the content frames 302 to provide different fingerprinting information to the look-up servers of different ACR vendors.

The different fingerprinting information may be uploaded to the look-up servers of the different ACR vendors, respectively. Different ACR vendors may be integrated on viewing devices manufactured by different contract equipment manufacturers (CEMs). For example, Toshiba televisions may utilize Samba® ACR fingerprinting and Samsung® televisions may use Enswer® ACR fingerprinting. An advantage of the fingerprinter 305 including ACR fingerprinting algorithms for different ACR vendors, may be to fingerprint content provided to viewers via different ACR vendors regardless of the manufacturer of the media consumption device. In one example, the ACR fingerprinting information are used for digital advertisement replacement (DAR). In another example, the ACR fingerprinting information are used for advertisement or content augmentation and data collection. The overlay decision engine 210 and the ad targeter 214 (FIG. 2) may use the fingerprinting information to match the encoded content with contextually-relevant advertisements, informational and/or interactive content. The matched content and/or advertisements may then be provided to the media devices 115 for streaming display thereon. In yet another example, information about matching events are communicated to a broadcast cloud for analysis of content matching.

The fingerprinter 305 may perform ACR fingerprinting upstream of broadcast distribution in the system. For example, the fingerprinting may occur in the broadcast chain where broadcast feeds are delivered for encoding/uploading. When a single broadcast feed is used, a number of devices and/or applications that may need to be purchased, installed, monitored, and maintained for ACR fingerprinting and encoding/uploading may be reduced. For example, capital expenses (CAPEX) and/or operational expenses (OPEX) may be reduced, such as a reduced system infrastructure (rack space, power, and Ethernet connectivity). Additionally, when a single broadcast feed is used, a number of broadcast feeds generated from a broadcaster's distribution amplifier may be reduced.

As discussed, the fingerprinter 305 may generate individual fingerprints 306a-n from multimedia content M, such as may pass through a broadcasting server, a headend, a switch, and/or a set-top box, in route to being displayed on one of the media devices 115. The fingerprints 306a-n may include one frame or a number of frames. The frames may be taken in a sequential order with chronological time stamps, or may be taken at some interval such as every other (or every third frame), for example, still with corresponding time stamps.

The fingerprint sequence matcher 325 may process a set or sequence of these individual fames (as a query fingerprint) to match the frames to frame fingerprints 306a-n (stored in the database 327) of original video content from which the corresponding video frames represented by these fingerprints originated. The frame fingerprints 306a-n may be single frames and each include a corresponding time slot (or some kind of index such as a frame number or an amount of time from the beginning of the media program). Finding a match may result in determining the media program the user is watching on the media device 115, a channel or a channel change, a time slot of a schedule in terms of beginning and ending times of the program, commercial time slots, and such information of the matching media program or television channel.

To have confidence in the matching results, the fingerprint sequence matcher 325 may take advantage of the fact that the sequence of the fingerprints 306a-n is ordered in time, and so the matching fingerprints 306a-n not only belong to the same video, but are similarly ordered in time. The fingerprint sequence matcher 325 may also use such temporal properties of sequences of frames in a fingerprint to detect how a matching fingerprint sequence was played out (faster, slower, or in reverse). An algorithm in the ACR fingerprint sequence matcher 325 may be implemented to detect certain playback scenarios, such as, for example, normal speed at full frame rate, normal speed at ½ frame rate, normal speed at ⅓ frame rate, or the like.

In some implementations, look-up server 206 identifies a channel being streamed to the media device 115 in response to the fingerprinter 305 finding a matching one or more frame fingerprints 306a-n in the database 327. The look-up server 206 may then search in the channel schedules database 330 for current scheduling information for that channel, to thereby determine the media program being streamed. The content manager 322 may then record, in the recorded ACR information database 123, the viewer's history of program watching on the media device 115. If the viewer turns off the media device 115, changes the channel, or if the media program is otherwise interrupted from streaming to the media device before finishing, the content manager 322 may record, in the recorded ACR information database 123, a source of the media program (e.g., from a particular broadcaster or broadcaster device) and a location in the media program at which the media program was interrupted.

In additional implementations, when the media device 115 returns to the channel from which the media program was previously interrupted, the media device 115 sends one or more messages in that regard to the content manager 322. The content manager 322 may look up, in the recorded ACR information database 123, viewing history on the media device and determine that the media program was previously interrupted. Moreover, the content manager 322 may communicate, in a reply message to the media device 115, that the media program was previously interrupted, and provide the source of the television broadcast and the location within the media program at which it was interrupted. In some examples, the media device 115 delivers an overlay 212 to a display of the media device with a prompt such as "Do you want to resume watching this Media Program," and a selectable indicator 213 that allows the viewer to agree or say no, e.g., through a remote control action. If the viewer responds with a no, the media device 115 may remove the overlay 212. If the viewer responds affirmatively, the media device 115 may begin streaming the media program from the source at the location recorded for the point in the media program where it was interrupted.

In some implementations, the content manager 322 coordinates with the overlay decision engine 210 and the overlay database 211 (FIG. 2) for delivery of the overlay 212 that targets an interaction with the look-up server 206 and access to the recorded ACR information database 123. The restart of the streaming may be to begin playing a Hypertext Transfer Protocol (HTTP) live streaming (HLS) stream from the television broadcaster, or from a buffered version of the remainder of the media program stored at the content manager 322.

Figure 4:
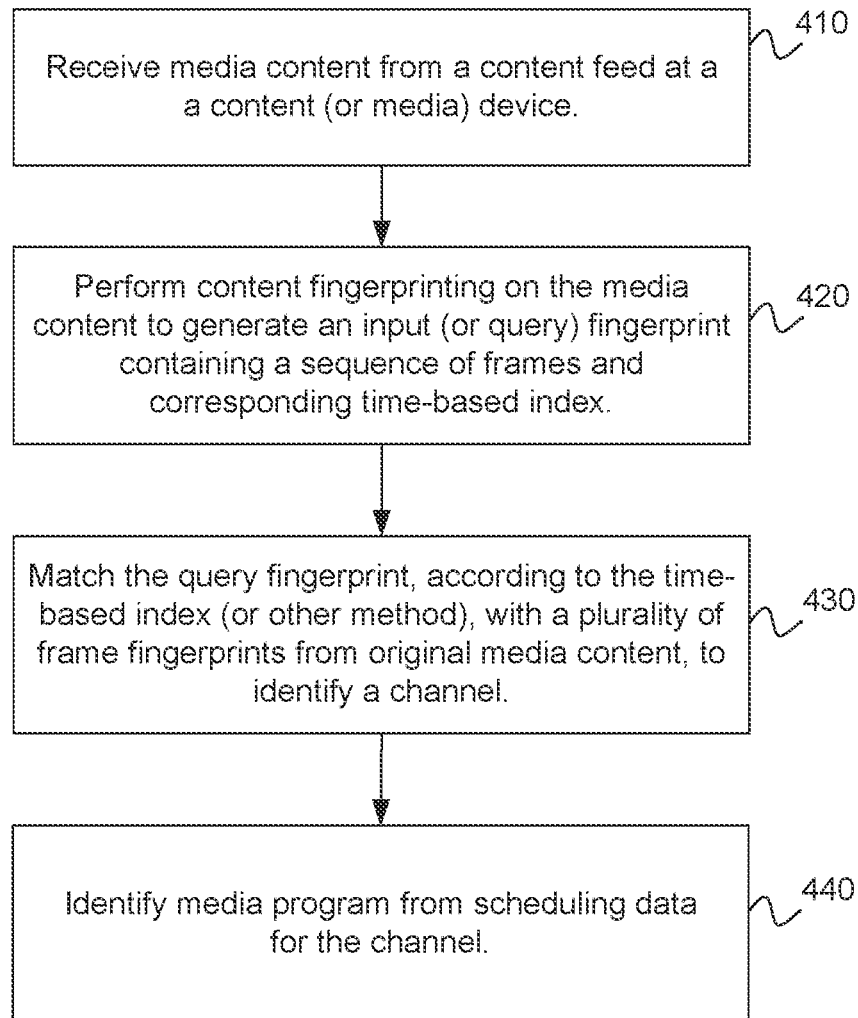
FIG. 4 illustrates a flowchart of an example method of ACR matching to identify a corresponding media program.

FIG. 4 illustrates an example flowchart of a method 400 of automatic content recognition (ACR) that matches a sequence of frames of an input (or query) fingerprint 306a to identify a corresponding television program. The method 400 may be at least partially performed by processing logic that may include data processing hardware (e.g., circuitry, dedicated logic, programmable logic, microcode, etc.), software (e.g., instructions executed by a processing device), firmware or a combination thereof. The method 400 may be performed by processing logic of the content manager 322, which may include a separate look-up server 206. The method 400 may also be performed, in part, by a client device such as client device 218 or 220, or by a server system such as the ACR system 124 or 126 of FIG. 1 or the ACR system 224 or 226 of FIG. 2. Alternatively, the method may be performed by other processing devices in various types of user devices, portable devices, televisions, projectors, or other media devices.

Referring to FIG. 4, the method 400 may begin with the processing logic receiving media content M from a content feed 103 at a content (or media) device (410). The method 400 continues with the logic performing fingerprinting on the media content M to generate an input (or query) fingerprint 306a containing a sequence of frames and a corresponding time-based index (such as corresponding time stamps) (420). The method 400 continues with the logic matching the query fingerprint 306a, according to the time-based index, with a plurality of frame fingerprints 306a-n from original media content M, to identify a channel that is currently streaming a media program (430). The method 400 may continue with the processing logic identifying the media program from scheduling data for the channel.

Figure 5:
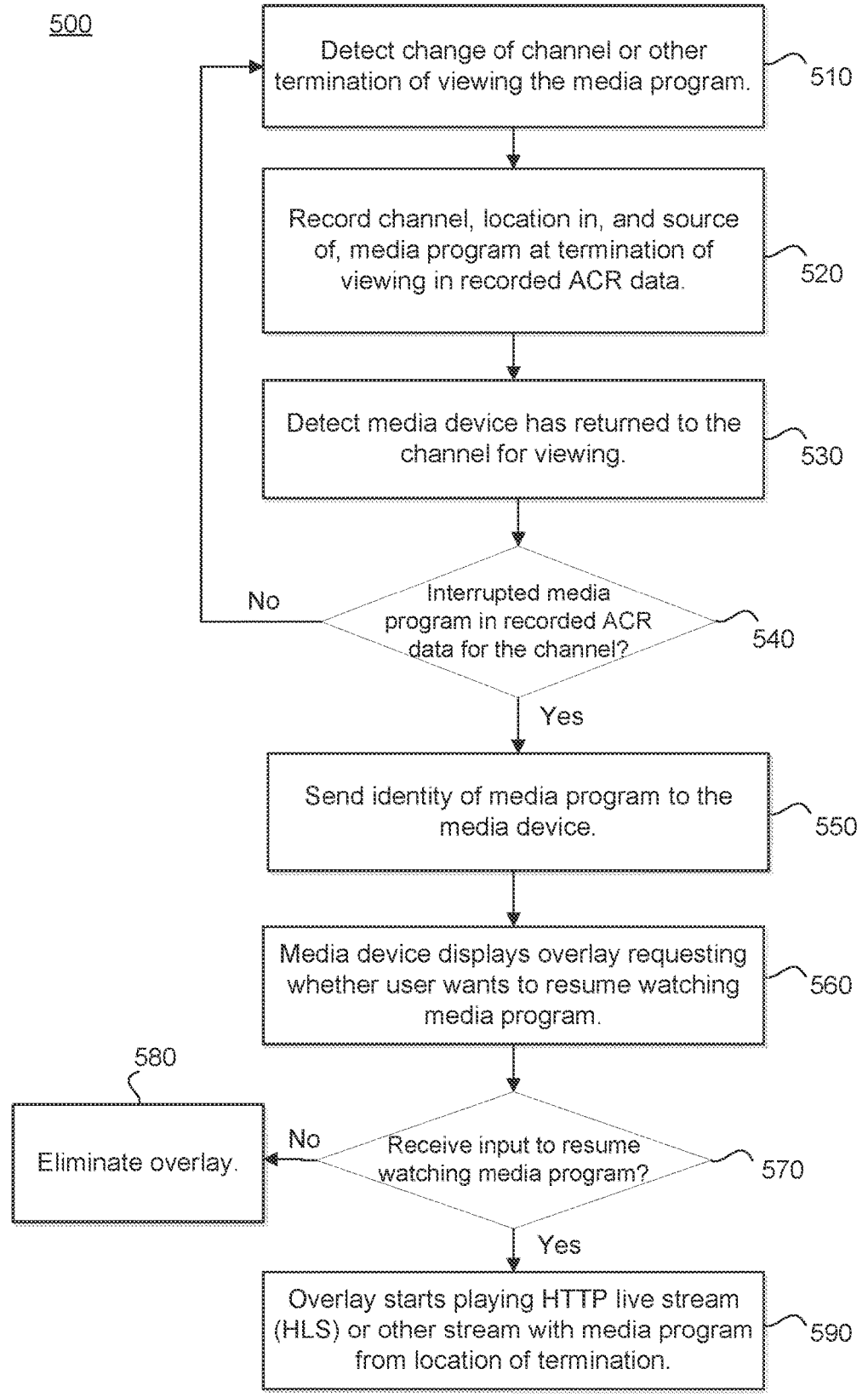
FIG. 5 illustrates a flowchart of an example method of ACR that detects interruption of a media program and provides the option to continue viewing the media program upon return to a channel on which the media program was previously streamed.

FIG. 5 illustrates an example flowchart of a method 500 of ACR that detects interruption of a media program and provides the option to continue viewing the media program upon return to a channel on which the media program was previously streamed. The method 500 may be at least partially performed by processing logic that may include data processing hardware (e.g., circuitry, dedicated logic, programmable logic, microcode, etc.), software (e.g., instructions executed by a processing device), firmware or a combination thereof. The method 500 may be performed by processing logic of the content manager 322, which may include a separate look-up server 206. The method 500 may also be performed, in part, by a client device such as client device 218 or 220, or by a server system such as the ACR system 124 or 126 of FIG. 1 or the ACR system 224 or 226 of FIG. 2. Alternatively, the method 500 may be performed by other processing devices in various types of user devices, portable devices, televisions, projectors, or other media devices.

Referring to FIG. 5, the method 500 may begin with the processing logic detecting a change of a channel or other termination of viewing the media program (510). The method 500 continues with the processing logic recording the channel, location in, and source of the media program at termination of the viewing in recorded ACR data, e.g., within the recorded ACR information database 123 (520). The method 500 continues with the processing logic detecting the media device has returned to the channel for viewing (530). This detecting may be performed by receipt of a message from the media device with an indication of a channel change or that the media device was turned onto that particular channel. The method 500 continues with the processing logic further determining whether the interrupted media program is located in the recorded ACR information database 123 (540). If it is not, the method 500 may start over at block 510.

If the interrupted media program is located in the database 123 (determination at block 540), the method 500 continues with the processing logic sending an identity of the media program to the media device (550). The method 500 may continue with the processing logic causing the media device to display an overlay requesting whether the user wants to resume watching the media program (560). The method 500 may continue with the processing logic determining whether an input is received, via the media device, to resume watching the media program (570). If not received (or if a negative response is received), the method 500 may continue with the processing logic removing the overlay 212 and proceeding with alternative commands from the media device (580). If an affirmative response is received, the method 500 may continue with the processing logic starting to play an HTTP live stream (HLS) or other type of television broadcast stream of the media program from the location at which the media program was previously terminated (590). The media program may be streamed from the original television broadcaster or may be streamed from a buffered version of the media program stored at the content manager 322 or other ACR system.

Figure 6:
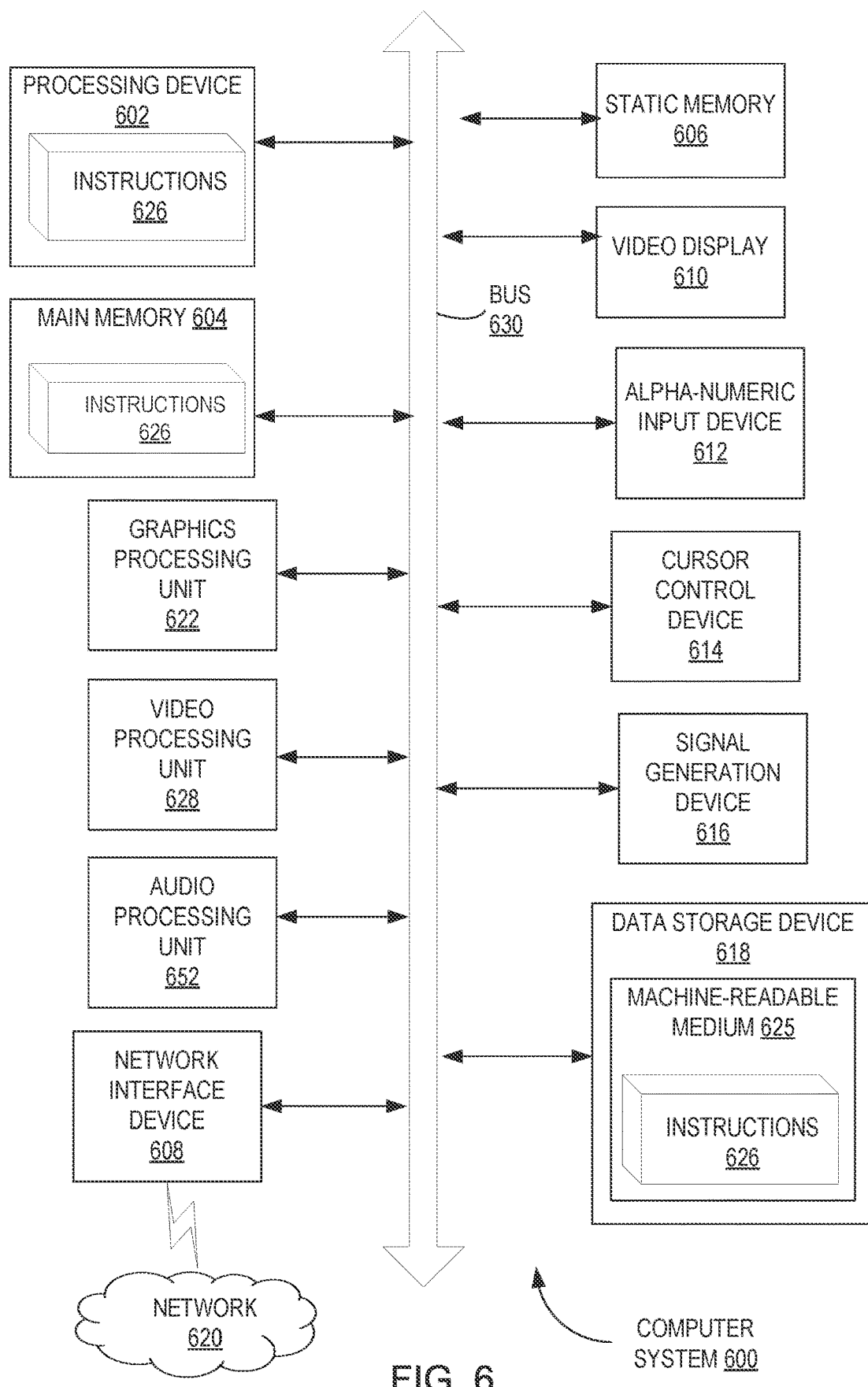
FIG. 6 illustrates a diagrammatic representation of a machine in the example form of a computer system within which a set of instructions, for causing the machine to perform any one or more of the methodologies discussed herein, may be executed.

FIG. 6 illustrates an example diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 may correspond to the ACR system 124 or 126 of FIG. 1, to the ACR system 224 or 226 of FIGS. 2 and 3, or to the content manager 122 of FIG. 1, the content manager 222 of FIG. 2, or the content manager 322 of FIG. 3. The computer system 600 may correspond to any media device 115 such as the client device 118 or 120 of FIG. 1. The computer system 600 may correspond to at least a portion of a cloud-based computer system.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In some implementations, processing device 602 may include one or more processing cores. The processing device 602 may execute the instructions 626 of a mirroring logic for performing the operations discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a signal generation device 616 (e.g., a speaker), or other peripheral devices. Furthermore, computer system 600 may include a graphics processing unit 622, a video processing unit 628, and an audio processing unit 632. In another embodiment, the computer system 600 may include a chipset (not illustrated), which refers to a group of integrated circuits, or chips, that are designed to work with the processing device 602 and controls communications between the processing device 602 and external devices. For example, the chipset may be a set of chips on a motherboard that links the processing device 602 to very high-speed devices, such as main memory 604 and graphic controllers, as well as linking the processing device 602 to lower-speed peripheral buses of peripherals, such as USB, PCI or ISA buses.

The data storage device 618 may include a computer-readable storage medium 625 on which is stored instructions 626 embodying any one or more of the methodologies of functions described herein. The instructions 626 may also reside, completely or at least partially, within the main memory 604 and/or within the processing device 602 during execution thereof by the computer system 600; the main memory 604 and the processing device 602 also constituting computer-readable storage media.

The computer-readable storage medium 625 may also be used to store instructions 626 utilizing logic and/or a software library containing methods that call the above applications. While the computer-readable storage medium 625 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions 626 for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further implementations.

While the present disclosure has been described with respect to a limited number of implementations, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The implementations are described with reference to secure memory repartitioning in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the present disclosure may be applied to other types of circuits or semiconductor devices that may benefit from higher pipeline throughput and improved performance. The teachings of implementations of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the present disclosure rather than to provide an exhaustive list of all possible implementations of implementations of the present disclosure.

Although the below examples describe instruction handling and distribution in the context of execution units and logic circuits, other implementations of the present disclosure may be accomplished by way of a data or instructions stored on a machine-readable, tangible medium, which when performed by a machine cause the machine to perform functions consistent with at least some implementations of the disclosure. In some implementations, functions associated with implementations of the present disclosure are embodied in machine-executable instructions. The instructions may be used to cause a general-purpose or special-purpose processor that is programmed with the instructions to perform the steps of the present disclosure. Implementations of the present disclosure may be provided as a computer program product or software which may include a machine or computer-readable medium having stored thereon instructions which may be used to program a computer (or other electronic devices) to perform one or more operations according to implementations of the present disclosure. Alternatively, operations of implementations of the present disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in some implementations, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In some implementations, use of the term logic includes hardware, such as transistors, registers, or other hardware, such as programmable logic devices.

Use of the phrase 'configured to,' in some implementations, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in some implementations, refers to some apparatus, logic, hardware, and/or element designed in such a way to enable use of the apparatus, logic, hardware, and/or element in a specified manner. Note as above that use of to, capable to, or operable to, in some implementations, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In some implementations, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in some implementations, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "some implementations" or "an embodiment" means that a particular feature, structure, or characteristic described in connection with the embodiment is included in at least some implementations of the present disclosure. Thus, the appearances of the phrases "in some implementations" or "in an embodiment" in various places throughout this specification are not necessarily all referring to the same embodiment. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct implementations, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "some implementations" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   detecting, by data processing hardware, a viewing cessation of a media program communicated from a source, upon which the media program was previously stored, to a media device;
   determining a location of the viewing cessation based on a cessation query fingerprint communicated from the media device, wherein the cessation query fingerprint is associated with sequential frames of media content associated with the media program and is generated by the media device;
   in response to detecting the viewing cessation, storing, by the data processing hardware and into a database, a record indicating the location of the viewing cessation within the media program;
   detecting, by the data processing hardware, a user-initiated viewing recommencement of the channel of the media device; and
   in response to detecting the user-initiated viewing recommencement of the channel:
      indicating that the viewing cessation of the media program on the channel occurred; and
      communicating, by the data processing hardware, with the media device to indicate the location of the viewing cessation within the media program, and to cause the media device to display an overlay, wherein the overlay is configured to receive input that causes the media device to stream the media program from the location of the viewing cessation.

2. The method of claim 1, wherein the cessation query fingerprint is associated with one or more frames of the media content that are presented by the media device at or preceding a time of the viewing cessation, wherein the method further comprises:
   determining, by the data processing hardware, that the cessation query fingerprint matches at least one frame fingerprint of a plurality of frame fingerprints of the media content provided by a television broadcaster, the matched at least one frame fingerprint associated with the source and a particular location within the media program,
   wherein the storing comprises, based on the matched at least one frame fingerprint being associated with the source and the particular location, storing the record to specify (i) the source and (ii) the particular location as the location of the viewing cessation within the media program.

3. The method of claim 1, wherein the cessation query fingerprint is associated with one or more frames of the media content that are presented by the media device at or preceding a time of or preceding the viewing cessation, wherein the method further comprises:
   determining, by the data processing hardware, that the cessation query fingerprint matches at least one frame fingerprint of a plurality of frame fingerprints of the media content provided by a television broadcaster, the matched at least one fingerprint associated with the channel, wherein the channel is of the television broadcaster; and
   based on the matched at least one fingerprint being associated with the channel, identifying, by the data processing hardware, (i) the media program from scheduling data for the channel and (ii) the location of the viewing cessation within the identified media program based on the time stamp of the cessation query fingerprint,
   wherein the storing comprises storing the record to specify the identified location as the location of the viewing cessation within the media program.

4. The method of claim 1, further comprising:
   making a determination, by the data processing hardware, that the query fingerprint fails to match frame fingerprints of the media program, the frame fingerprints of the media program corresponding to sequential frames of the media program stored in a fingerprint database in communication with the data processing hardware,
   wherein detecting the viewing cessation of the media program is based on the determination that the query fingerprint fails to match frame fingerprints of the media program.

5. The method of claim 1, further comprising:
   detecting, by the data processing hardware, receipt of the input that causes the media device to stream the media program from the source starting at the location of the viewing cessation;
   in response to detecting receipt of the input, providing, by the data processing hardware, the location of the viewing cessation within the media program to an advertisement targeter, the advertisement targeter configured to identify further overlay content based on viewing habits; and
   causing, by the data processing hardware, the media device to display the identified further overlay content.

6. The method of claim 1, wherein the source associated with the media program is the data processing hardware, the method further comprising:

detecting, by the data processing hardware, receipt of the input that causes the media device to stream the media program from the source starting at the location of the viewing cessation; and in response to detecting receipt of the input, playing, from the data processing hardware, the media program on the media device starting at the location of the viewing cessation.

7. The method of claim 1, wherein the media device is a television, and wherein the source associated with the media program is a live media feed source.

8. The method of claim 7, wherein the live media feed source comprises a Hypertext Transfer Protocol (HTTP) live streaming (HLS) stream.

9. The method of claim 1, wherein the viewing cessation corresponds to a channel change or a loss of power to the media device.

10. A system comprising:
data processing hardware; and
memory hardware in communication with the data processing hardware, the memory hardware storing instructions that when executed on the data processing hardware cause the data processing hardware to perform operations comprising:
detecting a viewing cessation of a media program communicated from a source, upon which the media program was previously stored, to a media device;
determining a location of the viewing cessation based on a cessation query fingerprint communicated from the media device, wherein the cessation query fingerprint is associated with sequential frames of media content associated with the media program and is generated by the media device;
in response to detecting the viewing cessation, storing, in a database, a record indicating the location of the viewing cessation within the media program;
detecting a user-initiated viewing recommencement of the channel of the media device; and
in response to detecting the user-initiated viewing recommencement of the channel:
indicating that the viewing cessation of the media program on the channel occurred, and
communicating, with the media device, to indicate the location of the viewing cessation within the media program, and to cause the media device to display an overlay, wherein the overlay is configured to receive input that causes the media device to stream the media program from the location of the viewing cessation.

11. The system of claim 10, wherein the cessation query fingerprint is associated with one or more frames of the media content that are presented by the media device at or preceding a time of the viewing cessation, wherein the operations further comprise:
determining that the cessation query fingerprint matches at least one frame fingerprint of a plurality of frame fingerprints of the media content provided by a television broadcaster, the matched at least one frame fingerprint associated with the source and a particular location within the media program,
wherein the storing comprises, based on the matched at least one frame fingerprint being associated with the source and the particular location, storing the record to specify (i) the source and (ii) the particular location as the location of the viewing cessation within the media program.

12. The system of claim 10, wherein the cessation query fingerprint is associated with one or more frames of the media content that are presented by the media device at or preceding a time of the viewing cessation, wherein the operations further comprise:
determining that the cessation query fingerprint matches at least one frame fingerprint of a plurality of frame fingerprints of the media content provided by a television broadcaster, the matched at least one frame fingerprint associated with the channel, wherein the channel is of the television broadcaster; and
based on the matched at least one fingerprint being associated with the channel, identifying (i) the media program from scheduling data for the channel and the location of the viewing cessation within the identified media program based on the time stamp of the cessation query fingerprint,
wherein the storing comprises storing the record to specify the identified location as the location of the viewing cessation within the media program.

13. The system of claim 10, wherein the operations further comprise:
making a determination that the query fingerprint fails to match frame fingerprints of the media program, the frame fingerprints of the media program corresponding to sequential frames of the media program stored in a fingerprint database in communication with the data processing hardware, and
wherein detecting the viewing cessation of the media program is based on the determination that the query fingerprint fails to match frame fingerprints of the media program.

14. The system of claim 10, wherein the operations further comprise:
detecting receipt of the input that causes the media device to stream the media program from the source starting at the location of the viewing cessation;
in response to detect receipt of the input, providing the location of the viewing cessation within the media program to an advertisement targeter, the advertisement targeter configured to identify further overlay content based on viewing habits; and
causing the media device to display the identified further overlay content.

15. The system of claim 10, wherein the source associated with the media program is the data processing hardware, and wherein the operations further comprise:
detecting receipt of the input that causes the media device to stream the media program from the source starting at the location of the viewing cessation within the media program; and
in response to detecting receipt of the input, playing, from the data processing hardware, the media program on the media device starting at the location of the viewing cessation.

16. The system of claim 10, wherein the media device is a television, and wherein the source associated with the media program is a live media feed source.

17. The system of claim 16, wherein the live media feed source is a Hypertext Transfer Protocol (HTTP) live streaming (HLS) stream.

18. The system of claim 10, wherein the viewing cessation corresponds to a channel change or a loss of power to the media device.

19. A non-transitory computer-readable medium having stored thereon instructions executable by a data processing hardware to cause the data processing hardware to perform operations comprising:
- detecting a viewing cessation of a media program communicated from a source, upon which the media program was previously stored, to a media device via a channel of the media device according to a schedule;
- determining a location of the viewing cessation based on a cessation query fingerprint communicated from the media device, wherein the cessation query fingerprint is associated with sequential frames of media content associated with the media program and is generated by the media device;
- in response to detecting the viewing cessation, storing, in a database, a record indicating that the viewing cessation of the media program on the channel occurred at the location of the viewing cessation within the media program;
- detecting a user-initiated viewing recommencement of the channel of the media device; and
- in response to detecting the user-initiated viewing recommencement of the channel:
  - indicating that the viewing cessation of the media program on the channel occurred, and
  - communicating, with the media device, to indicate the location of the viewing cessation within the media program, and to cause the media device to display an overlay, wherein the overlay is configured to receive input that causes the media device to stream the media program from the location of the viewing cessation.

20. The non-transitory computer-readable medium of claim 19, wherein the media device is a television, and wherein the source associated with the media program is a Hypertext Transfer Protocol (HTTP) live streaming (HLS) stream.

* * * * *